US011347560B2

(12) United States Patent
Culp et al.

(10) Patent No.: US 11,347,560 B2
(45) Date of Patent: *May 31, 2022

(54) SECURE SERVICE ISOLATION BETWEEN INSTANCES OF CLOUD PRODUCTS USING A SAAS MODEL

(71) Applicant: ForgeRock, Inc., San Francisco, CA (US)

(72) Inventors: Scott Culp, Bellevue, WA (US); Beau Croteau, Bay Shore, NY (US); Steve White, Battle Ground, WA (US)

(73) Assignee: ForgeRock, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/068,653

(22) Filed: Oct. 12, 2020

(65) Prior Publication Data
US 2021/0089359 A1    Mar. 25, 2021

Related U.S. Application Data

(63) Continuation of application No. 16/579,740, filed on Sep. 23, 2019, now Pat. No. 10,817,346.

(51) Int. Cl.
*H04L 12/00* (2006.01)
*G06F 9/50* (2006.01)
*G06F 21/62* (2013.01)

(52) U.S. Cl.
CPC .......... *G06F 9/5072* (2013.01); *G06F 9/5027* (2013.01); *G06F 9/5077* (2013.01); *G06F 21/6218* (2013.01)

(58) Field of Classification Search
CPC .... G06F 9/468; G06F 9/5072; G06F 21/6218; G06F 21/53; G06F 9/5027; G06F 9/5077
(Continued)

(56) References Cited

U.S. PATENT DOCUMENTS 10,303,576 B1    5/2019  Seymour et al.
10,630,501 B2 *  4/2020  Ansari ................... H04L 63/20
(Continued)

OTHER PUBLICATIONS

Cichonski et al., "Computer Security Incident Handling Guide", National Institute of Standards and Technology, U.S. Depailment of Commerce, Special Publication 800-61, Revision 2, http://dx.doi.org/10.6028/NIST.SP.800-61r2, Gaithersburg, MD, 2012, 79 pages.
(Continued)

*Primary Examiner* — Frantz Coby
(74) *Attorney, Agent, or Firm* — Haynes Beffel & Wolfeld, LLP; Ernest J. Beffel, Jr.

(57) ABSTRACT

The disclosed technology teaches initializing an application instance using a SaaS model in a project implemented on a cloud-based computing service, including running a configuration engine that links a service provider for SaaS application to set configuration parameters for the project and initializing the project in which an application instance will be built, then removing the authorization of the configuration engine to access the project and removing access to set the parameters. The technology also includes running a SaaS application infrastructure builder autonomously, without the service provider having access to the builder, to build the instance, and then delivering the application as a SaaS service.

25 Claims, 8 Drawing Sheets

(58) Field of Classification Search
USPC .................................................. 709/226, 227
See application file for complete search history.

(56) References Cited

U.S. PATENT DOCUMENTS

| | | | | |
|---|---|---|---|---|
| 10,686,885 | B2 * | 6/2020 | Goyal | ..................... G06F 9/455 |
| 10,705,808 | B2 * | 7/2020 | Chiosi | ................... H04L 41/145 |
| 10,817,346 | B1 * | 10/2020 | Culp | ....................... G06F 21/53 |
| 2015/0205708 | A1 | 7/2015 | Michelsen | |
| 2017/0295062 | A1 | 10/2017 | Tang | |
| 2020/0280517 | A1 * | 9/2020 | Kwon | ................... H04L 45/745 |
| 2021/0004253 | A1 | 1/2021 | Barnes et al. | |
| 2021/0072966 | A1 | 3/2021 | Zong et al. | |

OTHER PUBLICATIONS

"Hardening your cluster's security", Kubernetes Engine, (https://cloud.google.com/kubernetes-engine/docs/concepts/security-overview), Jul. 2019, 10 pages.

Dempsey, et al., "Information Security Continuous Monitoring (ISCM) for Federal Information Systems and Organizations", NIST National Institute of Standards and Technology, U.S. Dept. of Commerce, NIST Special Publication 800-137, 2011, Gaithersburg, MD, 80 pages.

"Configuring Vertical Pod Autoscaling", Kubernetes Engine, Google Cloud (https://cloud.google.com/kubernetes-engine/), Aug. 14, 2019, 8 pages.

Wilkin, "Kubernetes Deployment Dependencies", https://medium.com/google-cloud/kubernetes-deployment-dependencies-ef703e563956, Jul. 2, 2018, 21 pages.

"Vertical Pod Autoscaling", Kubernetes Engine, https://cloud.google.com/kubernetes-engine/docs/concepts/verticalpodautoscaler), Aug. 29, 2019, 8 pages.

Sakimura et al., "OpenID Connect Dynamic Client Registration 1.0 incorporating errata set 1", https://openid.net/specs/openid-connect-registration-1_0.html, Oct. 1, 2019, 19 pages.

Jayanandana, "Enable Rolling updates in Kubernetes with Zero downtime", https://medium.com/platformer-blog/enable-rolling-updates-in-kubernetes-with-zero-downtime-31d7ec.388c81, Sep. 27, 2018, 6 pages.

"FAQ: IDM/OpenIDM performance and tuning", https://backstage.forgerock.com/knowledge/kb/article/a32504603, Jun. 26, 2019, 7 pages.

U.S. Appl. No. 16/579,740, Notice of Allowance dated Jun. 29, 2020, 18 pages.

U.S. Appl. No. 16/659,553 Nonfinal Office Action dated Jul. 26, 2021, 29 pages.

U.S. Appl. No. 16/659,553 Response to Nonfinal Office Action dated Jul. 26, 2021, filed Aug. 20, 2021, 11 pages.

Amazon; AWS Elastic Beanstalk Developer Guide; Aug. 2019; 924 pgs (https://web.archive.org/web/20190805110626/https://docs.aws.amazon.com/elasticbeanstalk/latest/dg/awseb-dg.pdf).

U.S. Appl. No. 16/659,553 Notice of Allowance dated Oct. 22, 2021, 12 pages.

* cited by examiner

SECURE SERVICE ISOLATION BETWEEN INSTANCES OF CLOUD PRODUCTS USING A SAAS MODEL

CROSS-REFERENCE

This application is a continuation of U.S. application Ser. No. 16/579,740, titled "Secure Service Isolation Between Instances of Cloud Products Using a SaaS Model", filed 23 Sep. 2019, which issued as U.S. Pat. No. 10,817,346 on 27 Oct. 2020. The priority application is incorporated by reference herein.

FIELD OF THE TECHNOLOGY DISCLOSED

The technology disclosed relates generally to providing services to customers via a software as a service (SaaS) model in the cloud. The disclosed technology also relates to performing maintenance updates for the services without exposing data secured by the customer organization to the service provider. One disclosed implementation provides identity management services.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Businesses depend on computing systems to survive, and enterprise companies often utilize software as a service (SaaS) solutions in the cloud instead of installing servers within the corporate network to deliver services. According to International Data Corporation, almost half of all information technology (IT) spending will be cloud-based in 2018, "reaching 60% of all IT infrastructures and 60-70% of all software, services and technology spending by 2020."

Customer data and information created and stored in the cloud is an attractive target for attackers. The service provider for a SaaS app is an important attack vector, so it is especially useful to protect data from the service provider itself. Two attack scenarios to consider include onslaughts from an attacker who compromises the service provider in order to obtain access to the cloud service data, and a second potential strike by an employee of the service provider who already has access. Consequently, a need exists for secure authentication and authorization for customers who utilize cloud-based services, and for isolation of customer data, even from the service provider itself of secure authentications and authorizations.

An opportunity arises to enable organizations to build trusted relationships with people, services and things, utilizing an identity management service delivered via a SaaS model, to run an identity management instance under sovereign control of the organization. The customer can also pull maintenance updates for the organization's identity management instance from the identity management service provider without exposing data secured by the customer organization to the service provider.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

Figure 1:
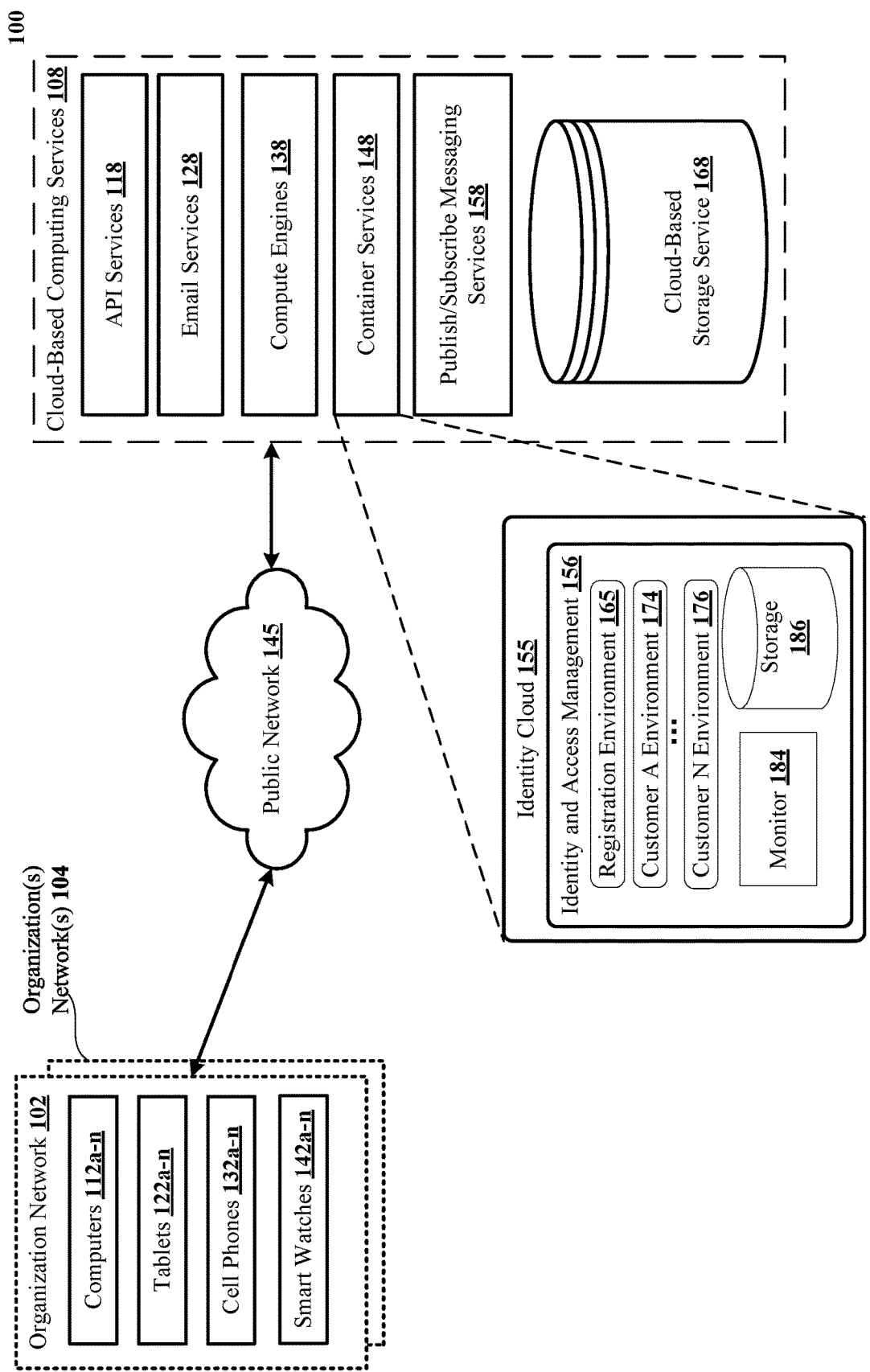
FIG. 1 shows an architectural level schematic of a system for initializing an identity management instance using a SaaS model for a project implemented on a cloud-based computing service.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

As more and more essential services like banking and commerce move to the cloud, more of people's personal data and financial instruments, such as credit cards, are housed in the cloud but these same capabilities make the cloud an attractive target for attackers trying to spread malware and carry out other malicious activity. SaaS solutions offer many business applications, including office software for documents, presentations, worksheets, databases, charts, graphs, digital paintings, electronic music and digital video. Additional SaaS services include messaging software, payroll processing software, DBMS software, management software, CAD software, development software, gamification, virtualization, accounting, customer relationship management (CRM), Management Information Systems (MIS), enterprise resource planning (ERP), invoicing, human resource management (HRM), talent acquisition, learning management, content management (CM), Geographic Information Systems (GIS) and service desk management. In one example, customers regularly create, edit and save files via Microsoft Office 365 and Google Apps, among others, in a cloud environment.

When enterprise companies utilize SaaS solutions to deliver services, they need to be able to protect the private data of their customers in the cloud environment. For the disclosed technology described, when a new customer registers for SaaS, the cloud service creates a new customer environment for the customer. Before the new tenant can begin to use the new customer environment, security resources must be provisioned. Although a straightforward way to provide customer identity and access management would be for the cloud service that creates the new customer environment to provision security resources, this approach would create a point of potential compromise. Inadvertently or through an attacker's directions, the cloud service that creates the new customer environment might retain information such as service account credentials, decryption keys, etc.

The disclosed technology is implemented in a cloud service that offers identity and access management services as a SaaS model in the cloud. In that service, every customer's identity management instance has the services it needs at hand, and the instance controls them, thus transforming the way organizations build trusted relationships. The disclosed technology includes pulling up the drawbridge before the customer's private data is accessible to even the identity and access management services, to secure the data of the customer's users. The customer environments' locus of control is internal. Nothing outside the instance has administrative control over the instance. In one example of using the disclosed technology, a bank may utilize identity and access management (IAM) while shielding the private data of each customer of the bank from the IAM provider as well as from other potential attackers. Identity and access management (IAM) refers to authentication of a user along with confirmation that the user is authorized to access the data they request. The disclosed technology delivers a sovereign instance of a cloud service, in this case identity management (IDM) and access management (AM) and the data services that support those functions, as a product referred to as FR-IDM in this application. In another use case, the disclosed security model could also support a cloud service that provides a different service, such as online games instead of identity and access management services.

The disclosed identity cloud creates a new customer environment by deploying a vanilla cloud-based computing cluster project with the needed APIs enabled, and then launching a bootstrapper of the security infrastructure for the project configures the cloud-based identity and access management components and then launches a manager that tends to the health of the customer's identity management instance moving forward. This cloud-based digital identity management service addresses stringent regulations for privacy and consent, including General Data Protection Regulation (GDPR), Health Insurance Portability and Accountability Act of 1996 (HIPAA), Open Banking, etc. for storing data securely, as well as enabling the monetization of customer relationships.

The next section describes an architecture for initializing an identity management instance using a SaaS model, to run under sovereign control of a customer organization, and to be able to pull maintenance updates for the identity management instance from the service provider without exposing data secured by the customer organization to the service provider.

Architecture

FIG. 1 shows an architectural level schematic of a system 100 for initializing an identity management instance using a SaaS model for a project implemented on a cloud-based computing cluster. Because FIG. 1 is an architectural diagram, certain details are intentionally omitted to improve clarity of the description. The discussion of FIG. 1 is organized as follows. First, the elements of the figure are described, followed by their interconnections. Then, the use of the elements in the system are described in greater detail.

System 100 includes organization network 102, identity cloud 155 with cloud-based computing services 108 and public network 145. System 100 can include multiple organization networks 104 for multiple organizations. Identity cloud 155 includes customer environments hosted on behalf of specific customers of a SaaS application. Each customer's environment interacts with an organization network 102. Organization network 102 includes computers 112$a$-$n$, tablets 122$a$-$n$, cell phones 132$a$-$n$ and smart watches 142$a$-$n$. In another organization network, organization users may utilize additional devices. Cloud-based computing services 108 includes API services 118, web email services 128, compute engines 138, container services 148 and publish/subscribe messaging services 158 which support event-driven, asynchronous communication among decoupled applications, such as microservices and serverless architectures. Also includes is cloud-based storage service 168. Cloud-based computing services 108 can include additional apps and services as well. Identity cloud 155 connects to organization network 102 and cloud-based computing services 108 via public network 145.

Identity cloud 155, implemented using container services 148 as indicated via the dotted lines, is a multi-tenant service for customer identity and access management 156 that includes pre-configuration for building rich applications with integrated and secure registration, account recovery, and modern multifactor authentication. Identity and access management cloud services includes registration environment 165 for registering new users and creating new customer environments and managing the overall health of the services, and also includes customer A environment 174 through customer N environment 176. Multiple different customers can have environments within a single identity cloud 155. In another implementation, the setup can be different. Customer data is stored within the customer environment. It is not co-mingled with other customers' data and can be accessed only by the customer.

Continuing further with the description of FIG. 1, system 100 can be used in the delivery of many kinds of services as cloud-based computing services 108: point to point streaming services, hosted services, cloud applications, cloud stores, cloud collaboration and messaging platforms, and cloud customer relationship management (CRM) platforms. The services can include peer-to-peer file sharing (P2P) via protocols for portal traffic such as BitTorrent (BT), user data protocol (UDP) streaming and file transfer protocol (FTP); voice, video and messaging multimedia communication sessions such as instant message over Internet Protocol (IP) and mobile phone calling over LTE (VoLTE) via the Session Initiation Protocol (SIP) and Skype. The services can handle Internet traffic, cloud application data, and generic routing encapsulation (GRE) data. A network service or application can be web-based (e.g., accessed via a uniform resource locator (URL)) or native, such as sync clients. Examples include software-as-a-service (SaaS) offerings, platform-as-a-service (PaaS) offerings, and infrastructure-as-a-service (IaaS) offerings, as well as internal enterprise applications that are exposed via URLs. Examples of common cloud-based services today include Salesforce.com™, Box™, Dropbox™, Google Apps™, Amazon AWS™, Microsoft Office 365™, Workday™, Oracle on Demand™, Taleo™, Yammer™, Jive™, and Concur™.

In the interconnection of the elements of system 100, public network 145 couples computers 112$a$-$n$, tablets 122$a$-$n$, cell phones 132$a$-$n$, smart watches 142$a$-$n$, API services 118, email services 128, compute engines 138, container services 148 with identity cloud 155, publish/subscribe messaging services 158 and cloud-based storage service 168 in communication. The communication path can be point-to-point over public and/or private networks. Communication can occur over a variety of networks, e.g. private networks, VPN, MPLS circuit, or Internet, and can use appropriate application program interfaces (APIs) and data interchange formats, e.g. REST, JSON, XML, SOAP and/or JMS. The communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, OAuth, Kerberos, SecureID, digital certificates, and more, can be used to secure the communications.

Further continuing with the description of the system architecture in FIG. 1, identity cloud 155 includes monitor 184 and storage 186 which can include one or more computers and computer systems coupled in communication with one another. Customer environments can emit health related data to monitor 184 and storage 186. They can also be one or more virtual computing and/or storage resources. Monitor 184 can be utilized to determine availability of customer environments and can include infrastructure level monitoring and basic application level metrics, as well as configuration controls for organization administrators of customers. For example, monitor 184 can utilize one or more Google Compute engines or Amazon EC2 instances and storage 186 can be Google Cloud Platform datastore or Amazon S3™ storage. The engines or system components of FIG. 1 are implemented by software running on varying types of computing devices. Example devices are a workstation, a server, a computing cluster, a blade server, and a server farm, or any other data processing system or computing device. The engine can be communicably coupled to the databases via a different network connection. For example, organization network 102 can be coupled via network(s) 145 (e.g., the Internet), identity cloud 155 can be coupled via a direct network link and cloud-based computing services 108 can be coupled by yet a different network connection.

Storage 186 can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object-oriented database management systems (OODBMSs), distributed file systems (DFS), no-schema database, or any other data storing systems or computing devices. In some implementations, the gathered metadata is processed and/or normalized. In some instances, metadata includes structured data and functionality targets specific data constructs provided by cloud-based computing services 108. Non-structured data, such as free text, can also be provided by, and targeted back to cloud-based computing services 108. Both structured and non-structured data are capable of being aggregated by identity cloud 155. For instance, assembled metadata can be stored in a semi-structured data format like a JSON (JavaScript Option Notation), BSON (Binary JSON), XML, Protobuf, Avro or Thrift object, which consists of string fields (or columns) and corresponding values of potentially different types like numbers, strings, arrays, objects, etc. JSON objects can be nested and the fields can be multi-valued, e.g., arrays, nested arrays, etc., in other implementations. These JSON objects can be stored in a schema-less or NoSQL key-value metadata store like Apache Cassandra™, Google's BigTable™, HBase™, Voldemort™, CouchDB™, MongoDB™, Redis™, Riak™, Neo4j™, etc.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same hardware.

Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein. The technology disclosed can be implemented in the context of any computer-implemented system including a database system or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Amazon Web Services (AWS)™, including Amazon Elasticsearch Service™ and Amazon Kinesis™, Apache Storm™, Apache Spark™, Apache Kafka™, Apache Flink™, Truviso™, IBM Info-Sphere™, Borealis™, and Yahoo! S4™.

Figure 2:
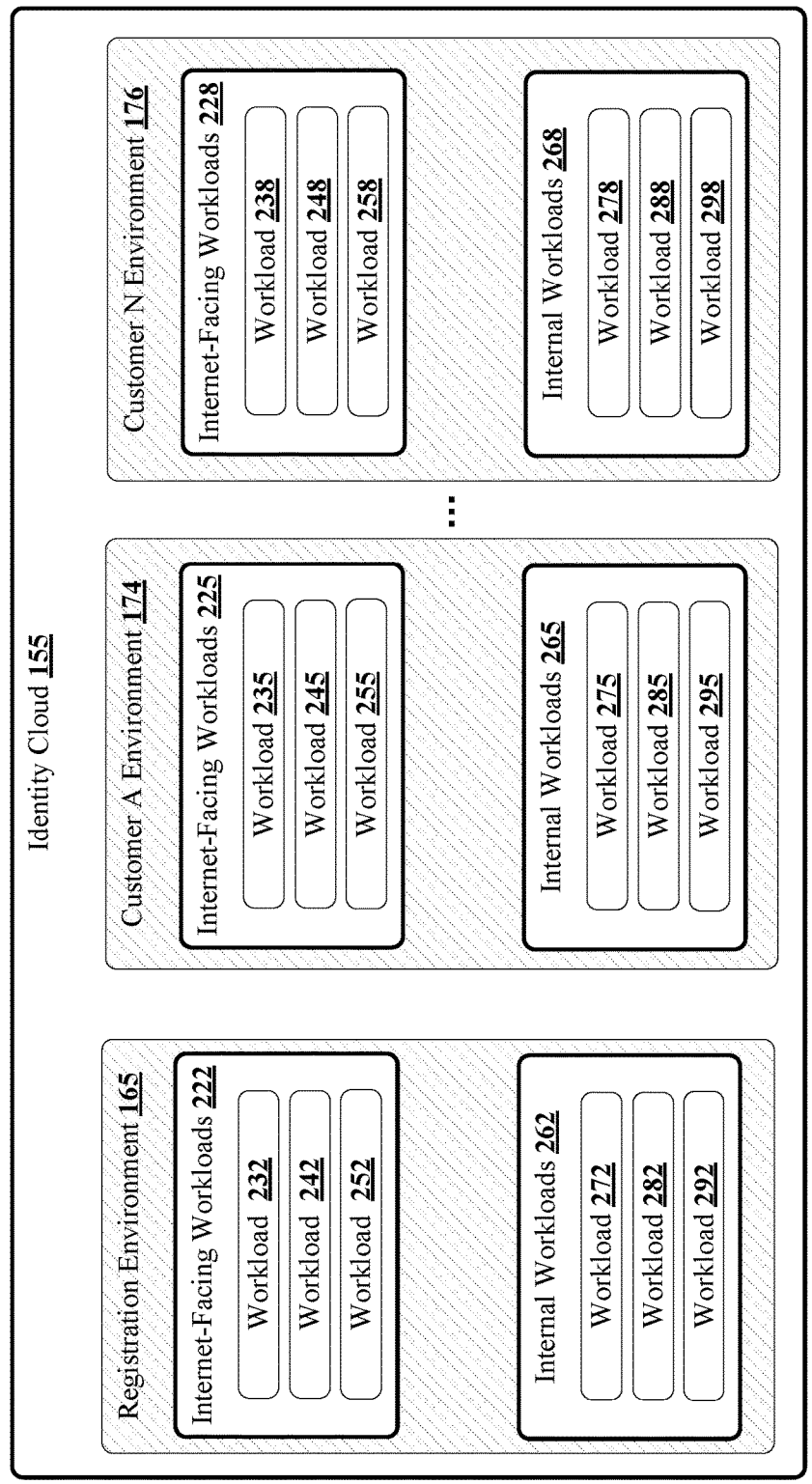
FIG. 2 shows a simplified block diagram of identity cloud usable for initializing an instance using a SaaS model for a project implemented on cloud-based computing service.

FIG. 2 shows a simplified block diagram 200 of identity cloud 155 usable for initializing an identity management instance using a SaaS model for a project implemented on cloud-based computing services 108, with registration environment 165 and customer A environment 174 through customer N environment 176. Identity cloud 155 utilizes a suite of cloud computing services, alongside a set of management tools, that provides a series of modular cloud services including computing, data storage and data analytics. In one case, identity cloud 155 is implemented using Google Cloud Platform (GCP) that provides infrastructure as a service, platform as a service, and serverless computing environments. GCP Platform is a part of Google Cloud, which includes the GCP public cloud infrastructure, as well as G Suite, enterprise versions of Android and Chrome OS, and application programming interfaces (APIs) for machine learning and enterprise mapping services. At the physical level, GCP provides encryption of data at rest. Data is encrypted when written to a hard drive and decrypted when read. In other cases, identity cloud 155 could be implemented using Amazon Web Services (AWS) or Microsoft Azure Virtual Machines. While it is understood that identity cloud 155 could be implemented via an AWS or Azure VM platform, the following description of the disclosed technology utilizes a GCP cloud-based computing cluster for an identity management instance using a SaaS model.

Continuing the description of the block diagram of FIG. 2, identity cloud 155 is hosted on GCP and deploys registration environment 165 which in turn deploys customer A environment 174 through customer N environment 176 as separate projects. In one implementation, the projects are implemented using Kubernetes (K8S), an open-source container-orchestration system for automating application deployment, scaling, and management. In another implementation, container services 148 can be implemented using a different technology such as virtual machines (VM) on compute engines. This description will use K8S as an example for projects. K8S works with container tools, including Docker, and provides a partitioning of the resources it manages into non-overlapping sets called namespaces. A Docker container running on a physical host is a lightweight self-contained environment sharing the host operating system, and with its own processor address space, memory address space and networking address space with network layer resources including IP addresses and transport layer resources including TCP port numbers.

Further continuing the description of the block diagram of FIG. 2, registration environment 165 includes internet-facing workloads 222 implemented in a distinct K8S namespace, with workloads 232, 242 and 252 each as a separate Docker container. In one implementation each namespace is a distinct trust zone. Similarly, internal workloads 262 are implemented in a distinct K8S namespace; and workload 272, 282 and 292 each utilize a separate container runtime, such as Docker or a 'rkt' container engine as a workload that implements the running application, libraries, and their dependencies.

The scheduling unit for K8S is a pod for grouping containerized components, with a pod including one or more containers that can share resources. Each pod is assigned a unique Pod IP address within the cluster, which allows applications to use ports without the risk of conflict. Within the pod, containers can reference each other on localhost, and containers can use a reference to a service, which holds a reference to the target pod at the specific Pod IP address, to address another container within another pod. Continuing, a pod can define a volume, such as a local disk directory or a network disk and expose it to the containers in the pod. Pods can be managed manually through the Kubernetes API, or their management can be delegated to a controller. Such volumes include the basis for the K8S features of 'Config-Maps' for providing access to configuration through the filesystem visible to the container, and 'Secrets' for providing access to credentials needed to access remote resources securely, by providing those credentials on the filesystem visible only to authorized containers.

Continuing with the description of FIG. 2, identity cloud 155 sets up trust zones to create a strong multi-layered defense against data breaches. Of note, each customer's environment comprises a dedicated trust zone that shares no code, data, or identities with other customers' environments. Customer A environment 174 includes internet-facing workloads 225 implemented in distinct K8S namespaces, with workload 235, 245 and 255 each as a separate Docker container. Similarly, internal workloads 265 are implemented in a distinct K8S namespace; and workload 275, 285 and 295 each utilize a separate Docker container. Similarly, customer N environment 176 includes internet-facing workloads 228 implemented in distinct K8S namespaces, with workload 238, 248 and 258 each as a separate Docker container. Similarly, internal workloads 268 are implemented in a distinct K8S namespace; and workload 278, 288 and 298 each utilize a separate Docker container. Only service-dedicated user accounts can log into identity cloud 155 and each customer environment is self-sufficient and sovereign and cannot access resources in the other environments. Even these environments are additionally segmented. Workloads at greater risk, such as those that accept input from Internet-based clients, are isolated to protect those performing higher-privileged operations. Every workload is encapsulated as a dedicated, hardened Docker container.

Figure 3:
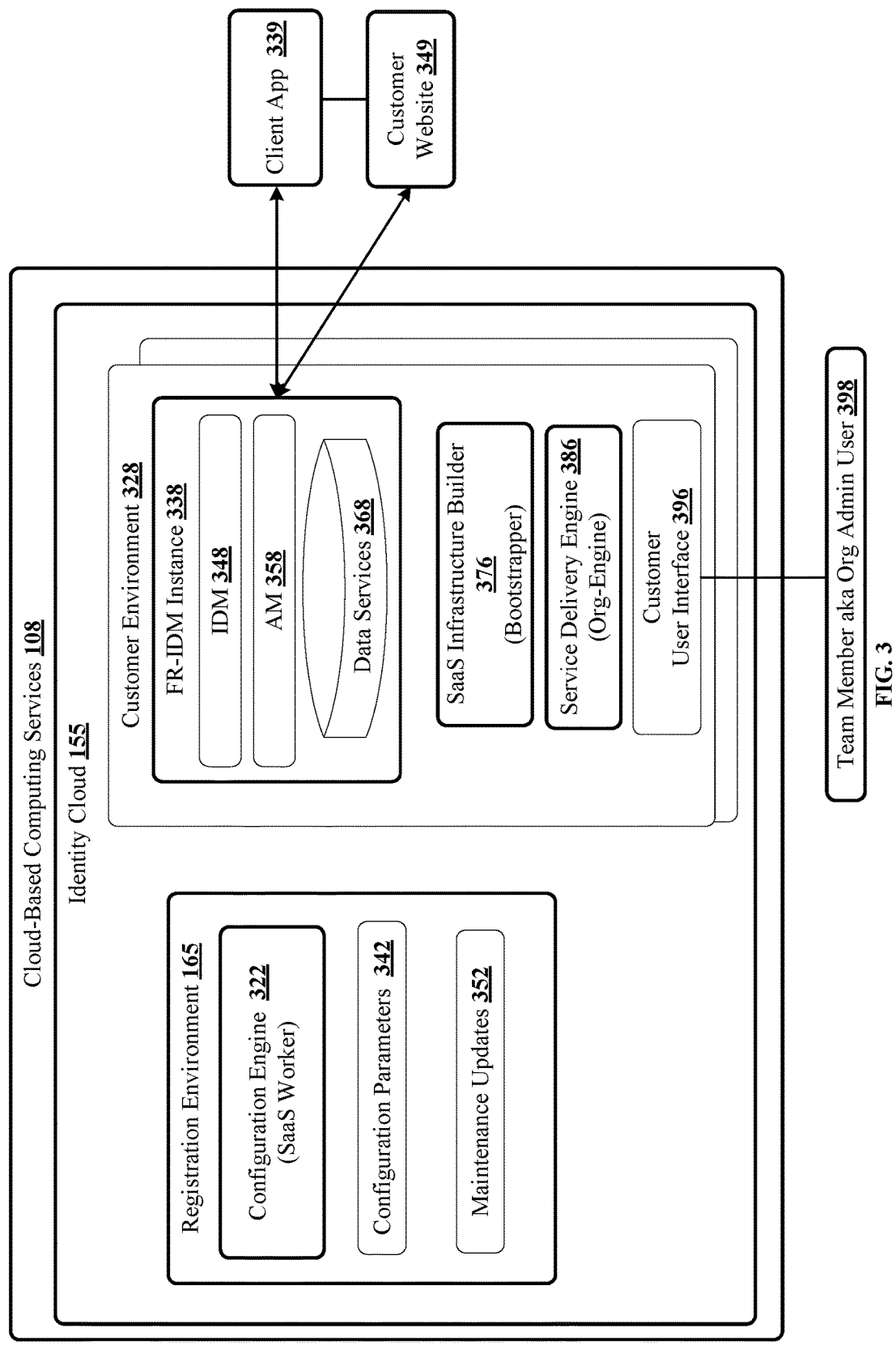
FIG. 3 shows a block diagram for implementing a product instance using a SaaS model for a project in cloud-based computing services.

FIG. 3 shows a block diagram 300 for implementing an identity management instance using a SaaS model for a project in cloud-based computing services 108. Because FIG. 3 is a block diagram, certain details are intentionally omitted to improve clarity of the description. Cloud-based computing services 108 includes identity cloud 155, client app 339, customer web site 349 and team member aka org admin user 398. Identity cloud 155 includes registration environment 165 with configuration engine 322 aka SaaS worker, for setting up a GCP project using configuration parameters 342 that specify the customer's requirements. Registration environment 165 registers a customer environment 328. Customer environment 328 includes SaaS infrastructure builder 376 aka bootstrapper, service delivery engine 386 aka org-engine and FR-IDM instance 338 with IDM 348, AM 358 and data services 368, which together provide a set of services for authenticating and authorizing a customer's users. In a different implementation, instance 338 can provide a different service.

Continuing the description of block diagram 300, client app 339 utilizes authentication and authorization services provided by FR-IDM instance 338 to customers. In some cases, the identity management instance delivers the identity management services to end user apps visiting a customer's web site. In other cases, the identity management instance delivers identity management services to a customer's web site that is in communication with the identity management instance running in the project.

Further describing block diagram 300, cloud-based computing services 108 can include multiple distinct customer environments 328 for multiple customers. Each customer's environment comprises a dedicated trust zone that shares no code, data, or identities with other customers' environments, as described earlier. In some cases, a customer environment 328 can include multiple FR-IDM instances 338. For example, a large bank may choose to have a distinct identity management instance for each region of the country. Cloud-based computing services 108 also includes SaaS IDM maintenance updates 352 and customer user interface 396 for communication with team member aka org admin user 398 who can set configuration settings, etc. via customer user interface 396.

Figure 4:
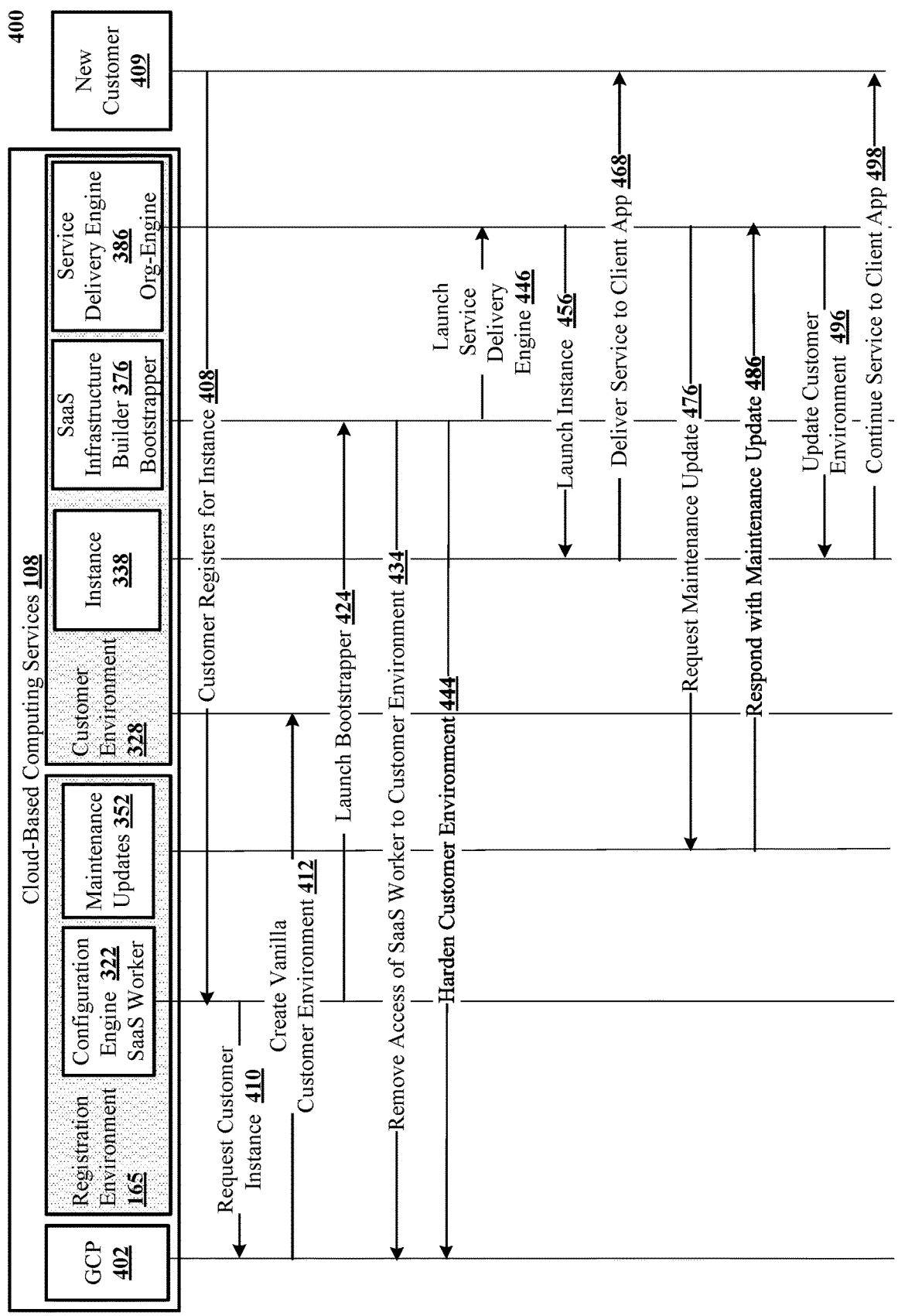
FIG. 4 shows a workflow diagram for initializing an identity management instance using a SaaS model for a project implemented on cloud-based computing services.

FIG. 4 shows a workflow diagram 400 for initializing an identity management instance using a SaaS model for a project implemented on cloud-based computing services. Message diagram 400 shows functionality and interactions of the blocks described relative to block diagram 300. When a new customer 409, such as a bank, registers for service 408, SaaS cluster configuration engine 322 aka SaaS worker requests a customer instance 410 and GCP 402 creates a customer environment 412, launching a new vanilla GCP K8S project. SaaS worker does not provision security-critical resources, thus avoiding a potential point of compromise, through either inadvertently or through an attacker's direction, retaining sensitive information such service account credentials, decryption keys, and so forth. After the customer environment is launched, SaaS cluster configuration engine 322 launches bootstrapper 424 aka SaaS infrastructure builder 376. SaaS infrastructure builder 376 pulls up the drawbridge after it is launched, removing access 434 of SaaS worker to the customer environment, effectively building a wall between SaaS cluster configuration engine 322 and the customer environment 328. The premise is that if SaaS cluster configuration engine 322 were compromised at any time subsequent to the creation of the customer environment, if would be of no consequence to the existing customer environment.

SaaS infrastructure builder 376 provisions security-critical resources, bootstrapping the security infrastructure of the K8S project. In one implementation, a TOML file is utilized to declare configuration parameters that define the customer organization to be used for deployment and state monitoring. TOML is a configuration file format that is intended to be easy to read and write due to obvious semantics. In another implementation, configuration parameters 342 can be specified using a different format.

Continuing with the description of workflow diagram 400, SaaS infrastructure builder 376 creates a dedicated K8S service account per namespace and grants it the needed K8S roles. SaaS infrastructure builder 376 also creates a dedicated GCP service account for each namespace and grants it the needed GCP roles. That is, each namespace has a dedicated K8s service account and a dedicated GCP service account, to create identity isolation. Even if a 'bad guy' compromised Namespace A and gained control over its K8s and GCP service accounts, neither would be valid in Namespace B, so it would be harder for the bad guy to extend the compromise. SaaS infrastructure builder 376 hardens customer environment 444, creating network policies limiting traffic between namespaces, creating pod security policies governing the workloads and packaging environment credentials into a K8S secret, using industry-wide best practices. An example of these and other aspects of hardening a Kubernetes engine cluster are described in "Hardening your cluster's security" which is cited with this application and available at https://cloud.google.com/kubernetes-engine/docs/how-to/hardening-your-cluster. Hardening typically includes disabling attribute-based access control and instead using role-based access control; restricting traffic with a network policy; using least privilege service accounts for nodes; restricting client authentication methods; disabling authentication with a client certificate or static password; and protecting node metadata. Additional hardening steps can also be included in the hardening process. Because SaaS infrastructure builder 376 pulls up the drawbridge before provisioning instance 338, SaaS cluster configuration engine 322 has no authorization to access, change or delete the customer project. That is, the disclosed technology isolates a customer's private data, to further secure the data of the customer's users.

Continuing further with the description of workflow diagram 400, after the hardening is complete, SaaS infrastructure builder 376 aka bootstrapper launches service delivery engine 446 aka org-engine which initializes the stack and remaining workloads, launches the FR-IDM instance 456 and manages service delivery, running under sovereign control of a customer organization. Instance 338 delivers identity management service to client app 468. In some cases, identity management service delivery is to a customer's website 349. Service delivery engine 386 requests maintenance updates 476 from registration environment 165 which responds with maintenance updates 352. In one implementation, maintenance updates are supplied from a Git repository. In another case, the maintenance updates can be supplied via a different delivery mechanism. Service delivery engine 386 updates customer environment 496 to instance 338 in customer environment 328, which continues to deliver service 498 to client app 339 and to customer website 349, accessing maintenance updates 352 for the authentication and authorization management FR-IDM instance 338 without exposing user data secured by the customer organization. Because the customer environment is sovereign, it reaches out on its own accord, retrieves the update, and installs it. No external agency has the power to force an update onto the customer environment, and this lack of access by outsiders protects the customer data.

A "break glass" scenario is disclosed for the rare but foreseeable event in which a customer needs assistance accessing their users' data, such as a case in which a malfunction in the customer's environment, perhaps due to a bug, causes the customer environment to enter a permanently broken state, in which it cannot make updates to 'unbreak' itself. A second case in which the "break glass" scenario could be needed would be if a hacker altered the system and the customer cannot gain access due to malware, a "break-glass" scenario can be utilized to assist the customer. Escrowed project access credentials, stored on a different platform than the cloud-based computing service, are available at a time when the customer organization requests support that requires access to the project and/or configuration parameters of the project. Project access credentials can also be escrowed offline. Access to the customer's FR-IDM instance requires at least two people collaborating to retrieve the credentials for the customer. Additionally, if the "break-glass" scenario for access is utilized, the service provider for SaaS identity management generates notices to the customer organization and a security administrator. These notices, which can be configured to register as alarms, propagate through the customer's system and through the identity cloud. These failsafe mechanisms provide protection for customers' user data while offering a solution to the dilemma posed when a customer is unable to access their user data.

Figure 5:
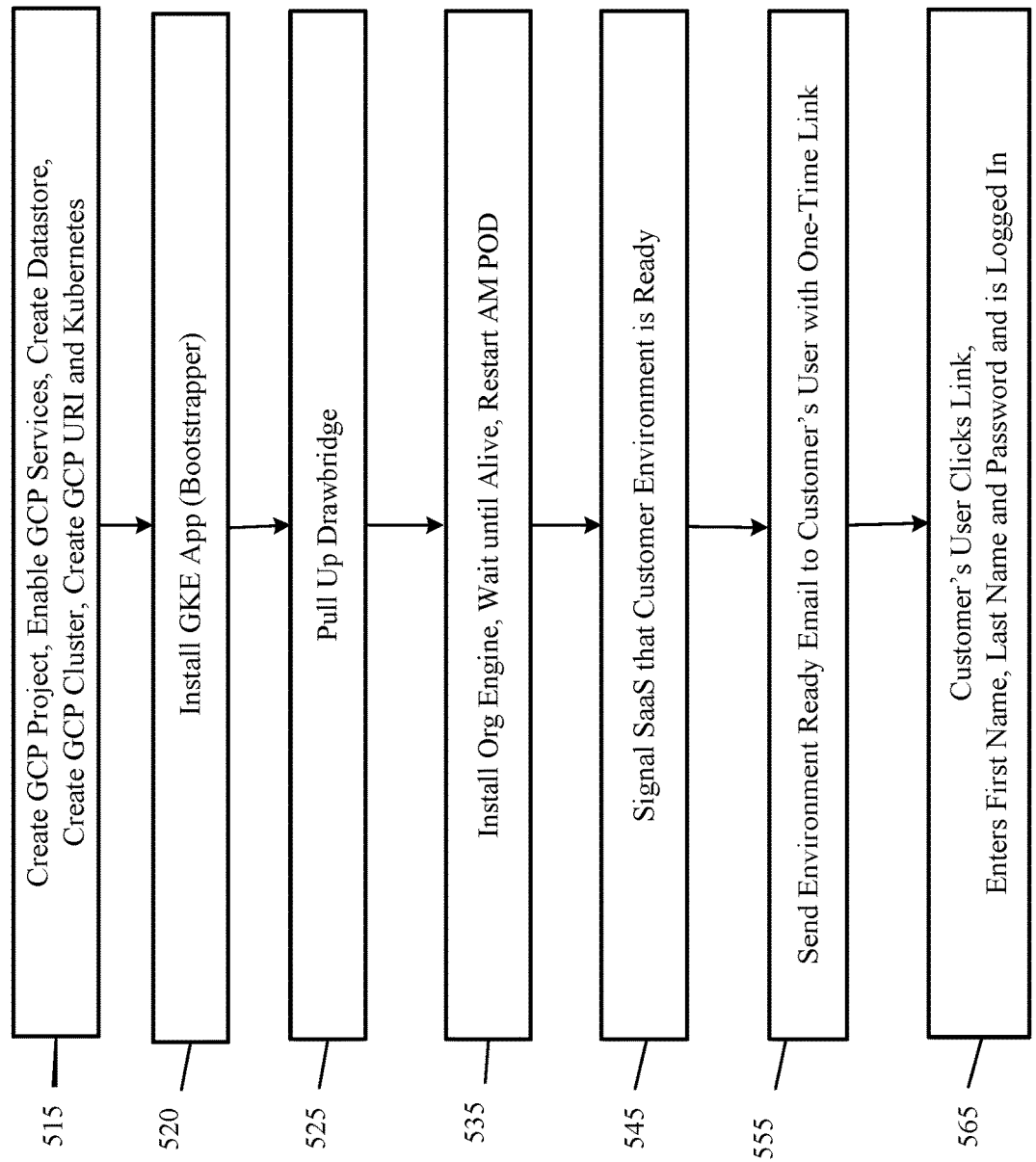
FIG. 5 shows a flowchart of steps utilized for initializing an identity management instance using a SaaS model for a project implemented on cloud-based computing services.

FIG. 5 shows a flowchart 500 of steps utilized for initializing an identity management instance using a SaaS model for a project implemented on cloud-based computing services. Step 515 includes creating a GCP project, enabling GCP services, creating a datastore and creating the Kubernetes. GCP services can include iam, compute, container DNS, sqladmin and appengine, and asynchronously checking for when the services enablement is complete. DNS registration is a service which allows the owner of a domain name to use their own name servers.

Step 520 includes launching the GKE app, aka bootstrapper 376. Step 525 includes pulling up the drawbridge; that is, the customer environment removes privileges to all accounts except those belonging to the customer environment.

Step 535 which includes installing org engine 386 and FR-IDM 338 and waiting until FR-IDM 338 is 'alive' and then restarting the POD with AM 358 to use new settings. Step 545 includes signaling SaaS that the customer environment is ready. Step 555 includes sending an environment ready email with a one-time link to the customer's user. Step 565 includes the customer's user clicking on the link, entering their first name, last name and password and achieving login. Other implementations may perform the actions in different orders and/or with different, fewer or additional actions than those illustrated in FIG. 5. Multiple actions can be combined in some implementations.

Workflow

Figure 6:
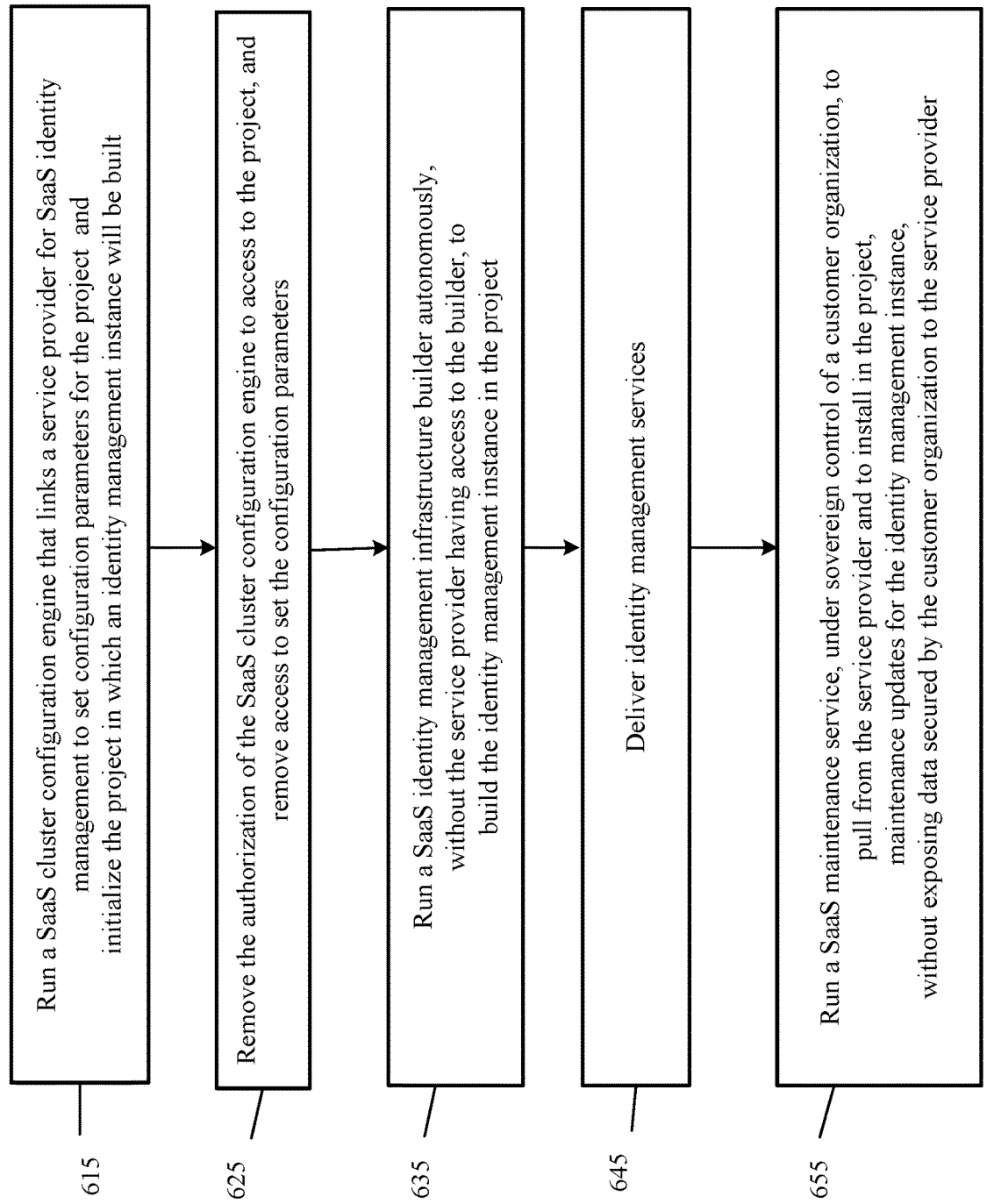
FIG. 6 shows a representative method of initializing an identity management instance using a SaaS model in a project implemented on a cloud-based computing service.

FIG. 6 shows a representative method of initializing an identity management instance using a software as a service (SaaS) model in a project implemented on a cloud-based computing service. Flowchart 600 can be implemented at least partially with a computer or other data processing system; that is, by one or more processors configured to receive or retrieve information, process the information, store results, and transmit the results. Other implementations may perform the actions in different orders and/or with different, fewer or additional actions than those illustrated in FIG. 6. Multiple actions can be combined in some implementations. For convenience, this flowchart is described with reference to a system which includes identity cloud 155.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features.

FIG. 6 begins with action 615 running a SaaS cluster configuration engine that links a service provider for SaaS identity management to set configuration parameters for the project implemented on the cloud-based computing service and initializing the project in which an identity management instance will be built.

Process 600 continues at action 625 with removing the authorization of the SaaS cluster configuration engine to access to the project, including removing access to set the configuration parameters.

Action 635 includes running a SaaS identity management infrastructure builder autonomously, without the service provider having access to the builder, to build the identity management instance in the project.

Action 645 includes delivering identity management services after the identity management instance is built.

At action 655, running a SaaS maintenance service, under sovereign control of a customer organization, to pull from the service provider and to install in the project, maintenance updates for the identity management instance, without exposing data secured by the customer organization to the service provider.

Other implementations may perform the actions in different orders and/or with different, fewer or additional actions than those illustrated in FIG. 6. Multiple actions can be combined in some implementations. For convenience, this flowchart is described with reference to the system that carries out a method. The system is not necessarily part of the method.

Additional Use Cases for Application Cloud

Figure 8:
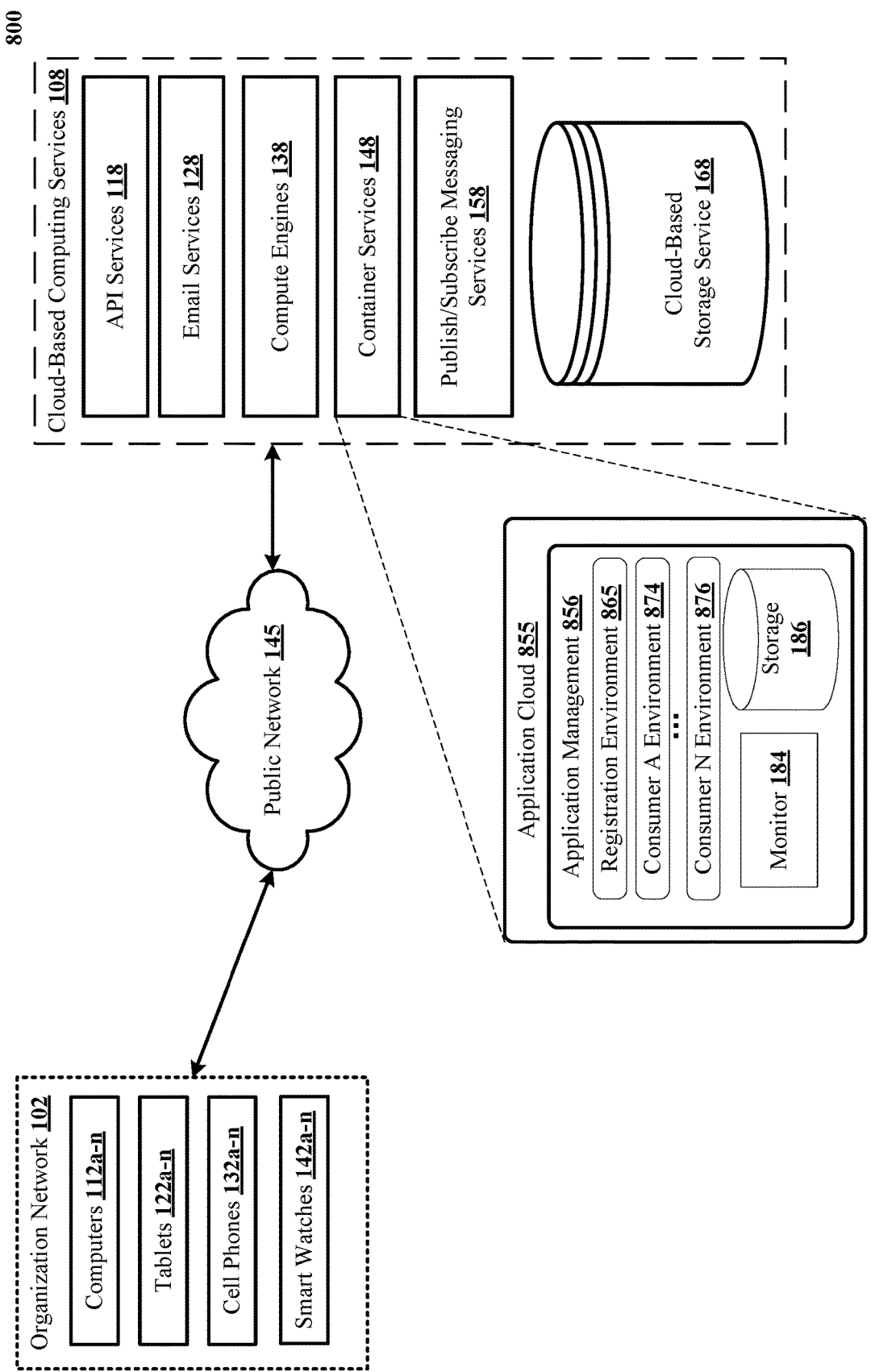
FIG. 8 shows an application cloud in an architectural level schematic of a system for initializing an application instance using a SaaS model for a project implemented on a cloud-based computing service.

In another use case, the disclosed security model can support a cloud service that provides a different service instead of identity and access management. FIG. 8 shows an application cloud 855 in an architectural level schematic of a system 800 for initializing an application instance using a SaaS model for a project implemented on a cloud-based computing service. Similar to the architecture of system 100 shown in FIG. 1, application cloud 855 is a service that hosts an application for use by multiple customers, which is implemented using container services 148 as indicated via the dotted lines. Application cloud 855 includes pre-configuration for building rich applications with integrated and secure registration, account recovery, and multifactor authentication. Application cloud 855 with application management 856 includes registration environment 865 for registering new consumer environments and managing the overall health of the services, and also includes consumer A environment 874 through consumer N environment 876. Multiple different consumers can have environments within a single application cloud 855. In another implementation, the setup can be different. Consumer data is stored within the customer environment. It is not co-mingled with other customers' data and can be accessed only by the customer.

System 800 also includes organization network 102 and public network 145. Organization network 102 includes computers 112*a-n*, tablets 122*a-n*, cell phones 132*a-n* and smart watches 142*a-n*. In another organization network, organization users may utilize additional devices. Cloud-based computing services 108 includes API services 118, web email services 128, compute engines 138, container services 148 and publish/subscribe messaging services 158 which support event-driven, asynchronous communication among decoupled applications, such as microservices and serverless architectures. Also included is cloud-based storage service 168. Cloud-based computing services 108 can include additional apps and services as well. Application cloud 855 connects to organization network 102 and cloud-based computing services 108 via public network 145. Application cloud 855 with application management 856 includes initializing a secure application instance isolated from malicious code and interacting with a server, with the initializing managed using a SaaS model in a project deployed on a cloud-based computing service.

For some use cases, compliance with the health insurance portability and accountability act (HIPAA,) which asserts data privacy and security provisions for safeguarding medical information, motivates the use of application cloud 855. In an example customer environment for cloud-based records management for doctors, the SaaS patient records portal instance for a first doctor is isolated from a distinct SaaS application instance utilized by a different doctor, so the records of patients stored for the first doctor are isolated from the patient records of other doctors. Even if another doctor's data gets breached, the data of the first doctor is not threatened by the breach due to isolation of the secure application instance, as described next.

For the disclosed technology, at a first time, a SaaS cluster configuration engine links a service provider for SaaS service to set configuration parameters for the project implemented on the cloud-based computing service and initializes the project in which the secure application instance will be built, then removes authorization of the SaaS cluster configuration engine to access to the project, including removing access to set the configuration parameters. At a second time following the first time, a SaaS service infrastructure builder autonomously, without the service provider having access to the builder, builds the secure application instance in the project, and after the secure application instance is built, delivers secure application services for interacting with the server. At a third time following the second time, a SaaS maintenance service runs, under sovereign control of a customer organization, to pull from the service provider and to install in the project, maintenance updates for the secure application instance, without exposing data secured by the customer organization to the service provider.

Because one doctor's instance of the SaaS records management system is isolated from an instance of the cloud-based records management system used by another doctor, the patient data of one doctor is isolated from and therefore protected from access by anyone outside the doctor's instance. Not even the SaaS configuration engine that initialized the project has authorization to access the doctor's instance, so cannot reach the doctor's patient data.

A major cost of data security compliance includes showing that one has complied with HIPAA and other laws. The disclosed technology offers a readily understandable conceptual model for separating the data of one doctor from the data of another doctor. Thus, the disclosed technology provides both strong protection for sensitive data and a comprehensible model for regulatory demonstration purposes. That is, to illustrate compliance with HIPAA laws to regulatory bodies, corporate boards and executive teams who scrutinize the customer applications that handle sensitive data, the disclosed technology for sovereign and isolated app instances enables ready illustration of the isolation between customer accounts. Customers who utilize the disclosed technology for deploying sovereign instances lessen the risk of cybersecurity threats related to data compromise of their users.

In another use case, 48% of law firms were subjected to cybersecurity audits in 2017. Even a small breach can result in extensive costs for the firm. For only one thousand records compromised, response and recovery costs can be as much as $225,000, as well as the breach of trust that clients have for the firm. To allay the threat of financial and reputational damage, a law firm can utilize a secure sovereign instance of a SaaS app in order to protect the intellectual property and trade secrets of clients of the firm, as described with the disclosed technology. Third party vendor and service providers could be provided access to one instance, which is isolated from the one that holds client data. The isolated instance of the SaaS app in use by the law firm protects client data generated and controlled by the sovereign app. Even the SaaS configuration engine that initialized the project has no access to the law firm's isolated instance so the intellectual property and trade secrets of clients of the firm.

Additionally, a distinct sovereign instance of a SaaS app can protect law firm employee data and the use of this technology can strengthen the required information security plan needed for cybersecurity compliance. For example, the law firm can utilize a sovereign instance of a SaaS HR app to manage HR functions for their firm, to ensure protection of employees' personally identifiable information (PII) such as social security number, date of birth, email username and password, federal EIN, driver's license, passport and military ID.

Continuing with the law firm use case, a distinct SaaS app can manage client billing and payments, to protect the firm's business clients' personal financial information (PFI), including payment cards (credit/debit); checking and banking accounts; and payroll, W2 and 1099 as required by the PCI-DSS security standard and FFIEC/SOC 2 standards. The disclosed isolation provides a technical safeguard for helping to prevent cyber-attacks as well, which enhances business continuity and can strengthen trust in the law firm by clients.

In another use case, application cloud 855 can be used in the delivery of gaming applications by smaller gaming companies that want to host in the cloud, in lieu of sourcing and maintaining servers for delivery of games to players in a gaming environment. A consumer of the disclosed technology can offer hosting to small online gaming shops. The intellectual property (IP) of each online game includes their unique code, such as for rendering visual elements effectively and smoothing images, in one example. The game shops need to protect the IP of each game developer, and can do so by utilizing a distinct sovereign instance to deliver each SaaS gaming app. The distinct instance of one cloud-based game is isolated from the instance of another game, so the IP in each game is protected from access by any other game app. The disclosed isolated model enables small online gaming shops to manage risk and be able to assure game developers that their competitors are unable to access proprietary IP.

Computer System

Figure 7:
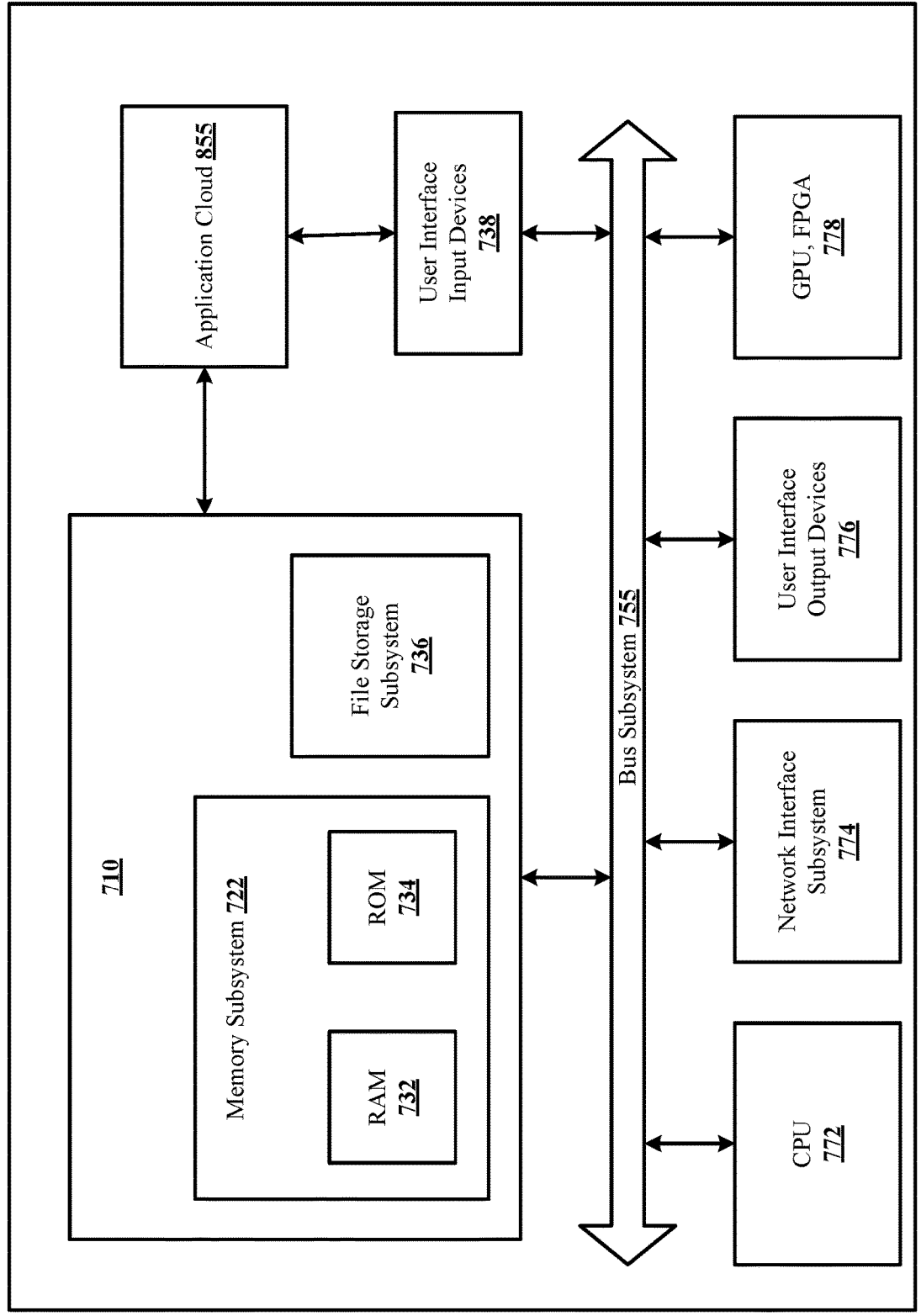
FIG. 7 is a simplified block diagram of a computer system that can be used for initializing an identity management instance using a SaaS model in a project implemented on a cloud-based computing service, according to one embodiment of the disclosed technology.

FIG. 7 is a simplified block diagram of a computer system 700 that can be used for initializing an application instance using a software as a service (SaaS) model in a project implemented on a cloud-based computing service. In one implementation the application instance is an identity management instance, as described earlier. Computer system 700 includes at least one central processing unit (CPU) 772 that communicates with a number of peripheral devices via bus subsystem 755, and application cloud 855, which in one implementation provides network security services described herein. These peripheral devices can include a storage subsystem 710 including, for example, memory devices and a file storage subsystem 736, user interface input devices 738, user interface output devices 776, and a network interface subsystem 774. The input and output devices allow user interaction with computer system 700. Network interface subsystem 774 provides an interface to outside networks, including an interface to corresponding interface devices in other computer systems. In one implementation, identity cloud 155 of FIG. 1 is communicably linked to the storage subsystem 710 and the user interface input devices 738. For a different implementation, application cloud 855 of FIG. 8 can be communicably linked to the storage subsystem 710 and the user interface input devices 738.

User interface input devices 738 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 700.

User interface output devices 776 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 700 to the user or to another machine or computer system.

Storage subsystem 710 stores programming and data constructs that provide the functionality of some or all of the modules and methods described herein. Subsystem 778 can be graphics processing units (GPUs) or field-programmable gate arrays (FPGAs).

Memory subsystem 722 used in the storage subsystem 710 can include a number of memories including a main random-access memory (RAM) 732 for storage of instructions and data during program execution and a read only memory (ROM) 734 in which fixed instructions are stored. A file storage subsystem 736 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 736 in the storage subsystem 710, or in other machines accessible by the processor.

Bus subsystem 755 provides a mechanism for letting the various components and subsystems of computer system 700 communicate with each other as intended. Although bus subsystem 755 is shown schematically as a single bus, alternative implementations of the bus subsystem can use multiple busses.

Computer system 700 itself can be of varying types including a personal computer, a portable computer, a workstation, a computer terminal, a network computer, a television, a mainframe, a server farm, a widely distributed set of loosely networked computers, or any other data processing system or user device. Due to the ever-changing nature of computers and networks, the description of computer system 700 depicted in FIG. 7 is intended only as a specific example for purposes of illustrating the preferred embodiments of the present invention. Many other configurations of computer system 700 are possible having more or fewer components than the computer system depicted in FIG. 7.

Particular Implementations

Some implementations and features for initializing an identity management instance using a software as a service (SaaS) model in a project implemented on a cloud-based computing service are described in the following discussion.

One implementation discloses a computer-implemented method of initializing an identity management instance using a SaaS model in a project implemented on a cloud-based computing service, including, at a first time, running a SaaS cluster configuration engine that links a service provider for SaaS identity management to set configuration parameters for the project implemented on the cloud-based computing service and initializing the project in which an identity management instance will be built, then removing the authorization of the SaaS cluster configuration engine to access to the project, including removing access to set the configuration parameters. The method also includes, at a second time following the first time, running a SaaS identity management infrastructure builder autonomously, without the service provider having access to the builder, to build the identity management instance in the project, and after the identity management instance is built, delivering identity management services. The disclosed method further includes at a third time following the second time, running a SaaS maintenance service, under sovereign control of a customer organization, to pull from the service provider and to install in the project, maintenance updates for the identity management instance, without exposing data secured by the customer organization to the service provider.

Another implementation discloses a computer-implemented method of initializing a secure application instance isolated from malicious code and interacting with a server, the initializing managed using a software as a service (SaaS) model in a project implemented on a cloud-based computing service, including at a first time, running a SaaS cluster configuration engine that links a service provider for SaaS service to set configuration parameters for the project implemented on the cloud-based computing service and initializing the project in which the secure application instance will be built, then removing authorization of the SaaS cluster configuration engine to access to the project, including removing access to set the configuration parameters. The method also includes at a second time following the first time, running a SaaS service infrastructure builder autonomously, without the service provider having access to the builder, to build the secure application instance in the project. The disclosed method further includes after the secure application instance is built, delivering secure application services for interacting with the server, and at a third time following the second time, running a SaaS maintenance service, under sovereign control of a customer organization, to pull from the service provider and to install in the project, maintenance updates for the secure application instance, without exposing data secured by the customer organization to the service provider.

The methods described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

One implementation of the disclosed method further includes the SaaS identity management infrastructure builder locking down and securing the project in which an identity management instance is built. For the disclosed implementations, the cloud-based computing service is one of Google Cloud Platform (GCP), Amazon Web Services (AWS) or Microsoft Azure Virtual Platform. Another service provider could be utilized as well.

The disclosed SaaS identity management instance provides authentication and authorization services to customers. Some implementations of the disclosed method further include the identity management instance delivering identity management services to end user apps visiting a customer's web site. Other implementations include the identity management instance delivering identity management services to a customer's web site that is in communication with the identity management instance running in the project.

Some implementations of the disclosed method further include the service provider for SaaS identity management utilizing a "break glass" scenario for accessing escrowed project access credentials, stored on a different platform than the cloud-based computing service, at a time when the customer organization requests support that requires access to the project and/or configuration parameters of the project, and generating one or more notices to the customer organization and a security administrator for the service provider that the "break glass" scenario has been invoked. For the disclosed method, at least two people must collaborate with the service provider for SaaS identity management to retrieve the credentials for the customer.

Other implementations of the disclosed technology described in this section can include a tangible non-transitory computer readable storage media, including program instructions loaded into memory that, when executed on processors, cause the processors to perform any of the methods described above. Yet another implementation of the disclosed technology described in this section can include a system including memory and one or more processors operable to execute computer instructions, stored in the memory, to perform any of the methods described above.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein. The scope of the technology disclosed is defined by the appended claims.

What is claimed is:

1. A computer-implemented method of initializing an identity management instance using a software as a service (abbreviated SaaS) model in a project implemented on a cloud-based computing service, including:
    at a first time, running a SaaS cluster configuration engine that links a service provider for SaaS identity management to set configuration parameters for the project implemented on the cloud-based computing service and initializing the project in which an identity management instance will be built, then removing authorization of the SaaS cluster configuration engine to access to the project, including removing access to set the configuration parameters;
    at a second time following the first time, running a SaaS identity management infrastructure builder autonomously, without the service provider having access to the builder, to build the identity management instance in the project; and
    after the identity management instance is built, delivering identity management services.

2. The computer-implemented method of claim 1, further including a customer organization controlling installation of maintenance updates, from the service provider, to the identity management instance delivering identity management services.

3. The computer-implemented method of claim 1, further including the SaaS identity management infrastructure builder locking down and securing the project in which an identity management instance is built.

4. The computer-implemented method of claim 1, wherein the cloud-based computing service is one of Google Cloud Platform (abbreviated GCP), Amazon Web Services (abbreviated AWS) or Microsoft Azure Virtual Platform.

5. The computer-implemented method of claim 1, wherein the identity management instance provides authentication and authorization services to customers.

6. The computer-implemented method of claim 1, further including the identity management instance delivering identity management services to end user apps visiting a customer's web site.

7. The computer-implemented method of claim 1, further including the identity management instance delivering identity management services to a customer's web site that is in communication with the identity management instance running in the project.

8. The computer-implemented method of claim 1, further including:
    the service provider for SaaS identity management utilizing a "break glass" scenario for accessing escrowed project access credentials, stored on a different platform than the cloud-based computing service, at a time when a customer organization requests support that requires access to the project and/or configuration parameters of the project; and
    generating one or more notices to the customer organization and a security administrator for the service provider that the "break glass" scenario has been invoked.

9. The computer-implemented method of claim 8, wherein at least two people must collaborate with the service provider for SaaS identity management to retrieve the credentials for the customer organization.

10. A tangible non-transitory computer readable storage media, including program instructions loaded into memory that, when executed on processors cause the processors to implement a method of initializing an identity management instance using a software as a service (abbreviated SaaS) model in a project implemented on a cloud-based computing service, the method including:
    at a first time, running a SaaS cluster configuration engine that links a service provider for SaaS identity management to set configuration parameters for the project implemented on the cloud-based computing service and initializing the project in which an identity management instance will be built, then removing authorization of the SaaS cluster configuration engine to access to the project, including removing access to set the configuration parameters;
    at a second time following the first time, running a SaaS identity management infrastructure builder autonomously, without the service provider having access to the builder, to build the identity management instance in the project; and
    after the identity management instance is built, delivering identity management services.

11. The tangible non-transitory computer readable storage media of claim 10, further including a customer organization controlling installation of maintenance updates, from the service provider, to the identity management instance delivering identity management services.

12. The tangible non-transitory computer readable storage media of claim 10, further including the SaaS identity management infrastructure builder locking down and securing the project in which an identity management instance is built.

13. The tangible non-transitory computer readable storage media of claim 10, wherein the cloud-based computing service is one of Google Cloud Platform (abbreviated GCP), Amazon Web Services (abbreviated AWS) or Microsoft Azure Virtual Platform.

14. The tangible non-transitory computer readable storage media of claim 10, wherein the identity management instance provides authentication and authorization services to customers.

15. The tangible non-transitory computer readable storage media of claim 10, further including the identity management instance delivering identity management services to end user apps visiting a customer's web site.

16. The tangible non-transitory computer readable storage media of claim 10, further including the identity management instance delivering identity management services to a customer's web site that is in communication with the identity management instance running in the project.

17. The tangible non-transitory computer readable storage media of claim 10, further including:
    the service provider for SaaS identity management utilizing a "break glass" scenario for accessing escrowed project access credentials, stored on a different platform than the cloud-based computing service, at a time when a customer organization requests support that requires access to the project and/or configuration parameters of the project; and generating one or more notices to the customer organization and a security administrator for the service provider that the "break glass" scenario has been invoked.

18. The tangible non-transitory computer readable storage media of claim 17, wherein at least two people must collaborate with the service provider for SaaS identity management to retrieve the credentials for the customer organization.

19. A system for initializing an identity management instance using a software as a service (abbreviated SaaS) model in a project implemented on a cloud-based computing service, the system including a processor, memory coupled to the processor and computer instructions from the non-transitory computer readable storage media of claim 10 loaded into the memory.

20. The system of claim 19, further including a customer organization controlling installation of maintenance updates, from the service provider, to the identity management instance delivering identity management services.

21. The system of claim 19, further including the SaaS identity management infrastructure builder locking down and securing the project in which an identity management instance is built.

22. The system of claim 19, further including the identity management instance delivering identity management services to end user apps visiting a customer's web site.

23. The system of claim 19, further including the identity management instance delivering identity management services to a customer's web site that is in communication with the identity management instance running in the project.

24. A computer-implemented method of initializing a secure application instance isolated from malicious code and interacting with a server, the initializing managed using a software as a service (abbreviated SaaS) model in a project implemented on a cloud-based computing service, including:
- at a first time, running a SaaS cluster configuration engine that links a service provider for SaaS service to set configuration parameters for the project implemented on the cloud-based computing service and initializing the project in which the secure application instance will be built, then removing authorization of the SaaS cluster configuration engine to access to the project, including removing access to set the configuration parameters;
- at a second time following the first time, running a SaaS service infrastructure builder autonomously, without the service provider having access to the builder, to build the secure application instance in the project; and
- after the secure application instance is built, delivering secure application services for interacting with the server.

25. The computer-implemented method of claim 24, further including a customer organization controlling installation of maintenance updates, from the service provider, to the secure application instance delivering identity management services.

* * * * *